(12) United States Patent
Mittal

(10) Patent No.: US 6,233,609 B1
(45) Date of Patent: *May 15, 2001

(54) METHOD AND APPARATUS FOR REMOTE INTERACTION WITH AND CONFIGURATION OF A WAN-BASED KNOWLEDGE BASE

(75) Inventor: Sanjay Mittal, Fremont, CA (US)

(73) Assignee: Selectica, Inc, San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/199,136

(22) Filed: Nov. 24, 1998

Related U.S. Application Data

(63) Continuation-in-part of application No. 08/962,594, filed on Oct. 31, 1997, now Pat. No. 6,049,822.

(51) Int. Cl.$^7$ ...................................................... G06F 13/00
(52) U.S. Cl. .......................... 709/219; 709/217; 709/329; 705/26
(58) Field of Search .................................... 709/203, 202, 709/217, 218, 219, 313, 328, 329; 707/10, 102, 103, 513; 345/339, 356

(56) References Cited

U.S. PATENT DOCUMENTS

| | | | |
|---|---|---|---|
| 5,623,656 | * | 4/1997 | Lyons ...................................... 707/10 |
| 5,630,025 | * | 5/1997 | Dolby et al. ............................ 706/46 |
| 5,710,887 | * | 1/1998 | Chellish et al. ........................ 705/26 |
| 5,748,188 | * | 5/1998 | Hu et al. ................................ 345/326 |
| 5,790,977 | * | 8/1998 | Ezekiel .................................. 702/122 |
| 5,806,071 | * | 9/1998 | Balderrama et al. ................. 707/104 |
| 5,835,712 | * | 11/1998 | DuFresne .............................. 709/203 |
| 5,870,558 | * | 2/1999 | Branton, Jr. et al. ................. 709/224 |
| 5,870,771 | * | 2/1999 | Oberg .................................... 707/502 |
| 5,877,966 | * | 3/1999 | Morris et al. .................... 395/500.05 |
| 5,890,158 | * | 3/1999 | House et al. ............................ 707/10 |
| 5,897,622 | * | 4/1999 | Blinn et al. ............................. 705/26 |
| 5,909,545 | * | 6/1999 | Frese, II et al. ...................... 709/208 |
| 5,963,953 | * | 10/1999 | Cram et al. ........................... 707/102 |
| 6,014,657 | * | 1/2000 | Weida et al. .............................. 707/2 |
| 6,061,057 | * | 5/2000 | Knowlton et al. .................... 345/335 |

* cited by examiner

*Primary Examiner*—Viet D. Vu
(74) *Attorney, Agent, or Firm*—Donald R Boys; Central Coast Patent Agency Inc.

(57) ABSTRACT

A system for selling products and services over the Internet, or other wide area network, comprises a knowledge base and a knowledge base configurator both executing on a network-connected server hosted by the enterprise offering products and/or services. A GUI user interface application is downloaded from the server to any platform used by a client wishing to purchase products or services. Having downloaded the user interface, the client can manipulate the configurator over a data link between the client's station and the server to configure the knowledge base to define products and/or services to be orders, and can complete orders. A preferred implementation is with the server as an enterprise-hosted server connected to the Internet, and clients as users connected typically through Internet Service Providers to the Internet.

8 Claims, 3 Drawing Sheets

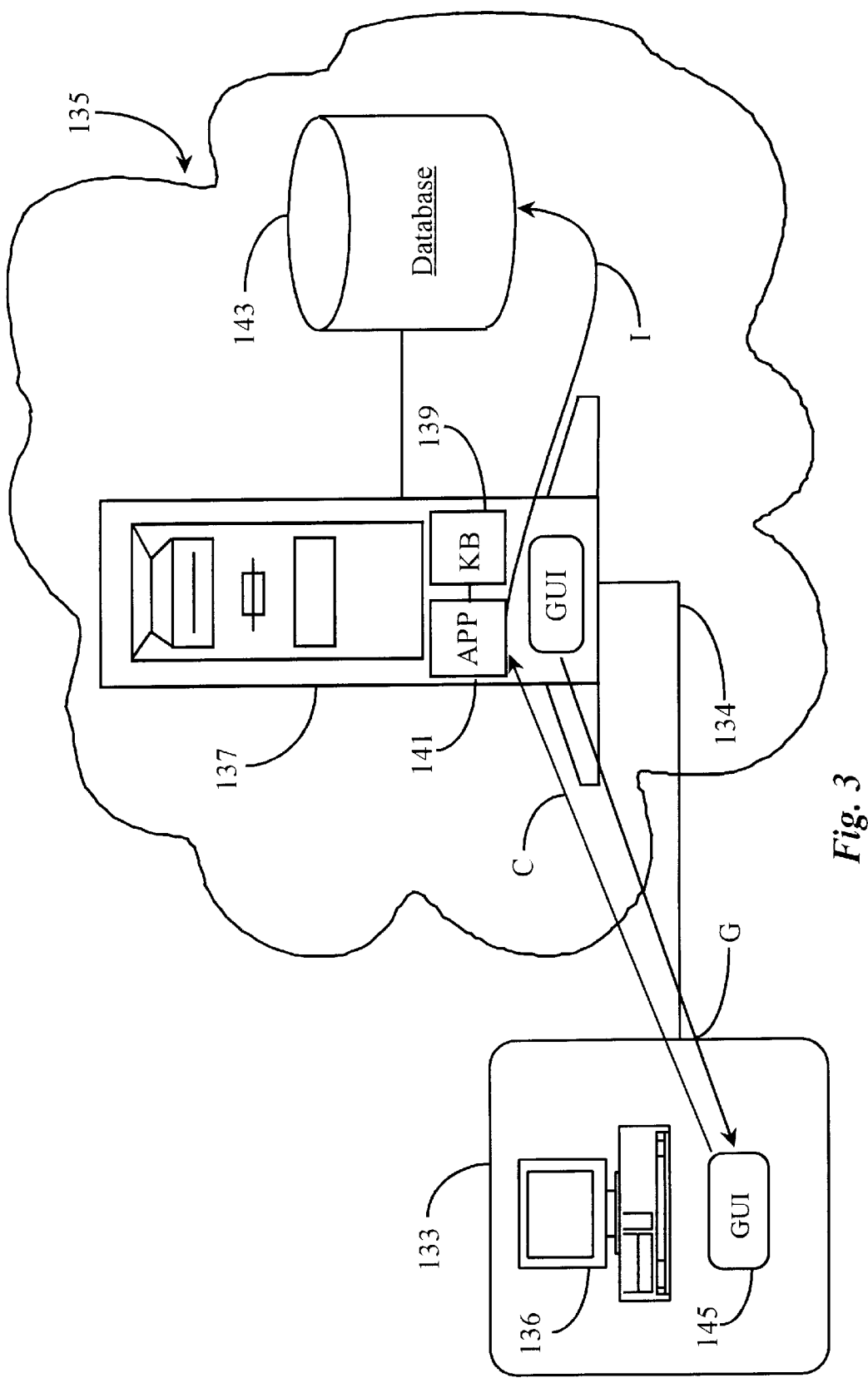

METHOD AND APPARATUS FOR REMOTE INTERACTION WITH AND CONFIGURATION OF A WAN-BASED KNOWLEDGE BASE

CROSS-REFERENCE TO RELATED DOCUMENTS

The present invention is a continuation in part (CIP) of application Ser. No. 08/962,594 filed Oct. 31, 1997, entitled Method for Generating and Updating Knowledge-Based Configurators that are Multi Platform and Multi Language Capable, now U.S. Pat. No. 6,049,822, which is incorporated herein in it's entirety by reference.

FIELD OF THE INVENTION

The present invention is in the field of computer-aided sales and advertising and has particular application to software applications for interacting with and configuring knowledge bases presented on a wide area network (WAN) via a remote computer or shared network connection.

BACKGROUND OF THE INVENTION

Computer-aided sales presentations wherein rules-based configurators are employed have long been a valuable tool for allowing a customer or client to configure his or her own order of a product or products. This technique is employed in a network environment whereby a client configures his or her order and sends it over the Internet, or another type of network, to a seller which can fill the order. For example, a complex computer system has many different features, accessories, options, etc. With the appropriate software program, a client can configure his or her own custom order for a particular brand or type of system. By employing an interactive method a client can apply certain desired features in his product-order configuration that were chosen from options provided by a seller.

More recently, it is known to the inventor that object-oriented, constraint-based configurators have begun to replace rules-based configurators by virtue of their more flexible organization. For example, rules-based configurators rely on set rules that are programmed in a procedural computer language. Partly for this reason, every change in the merchandise offered may require substantial changes in the software, which can be quite a lot of work, considering the fast pace of trade today.

Rules-based configurators are not physically separated from the actual knowledge data and the application for manipulating the knowledge data. Knowledge base configurators known to the inventor have such separation (an applet) therefore, the knowledge base can be changed easily via an editing process. The knowledge base applies the changes via linking to other elements of the process such as the object model.

Generally speaking, an object model representing a product, such as a new automobile, is created using a programming language within a model building application at the sellers end. This object model contains all of the descriptive elements and various features including cost information about the object it represents. A model writer procedure then writes a binary file, which is readable only to applications written in the same environment.

These object models can then be presented to a client having the appropriate software application on the correct platform and using the required language. The client can then enter his desired choices or options via interactive software. A configurator commonly known as a run-time engine insures that the client's choices are applied correctly. The configurator is also adapted to negate any conflict or impossibility that may arise from the client's directives.

A difficulty with the current state of the art, which has hampered fast deployment of knowledge bases severely, is that although a knowledge base is superior to a rules base as described above, the knowledge base is language-dependent and not easily transferred across different platforms (i.e. IBM to Macintosh, or even Win 3.1 vs. Win 95). For example, a client would be required to operate in the same computer platform and language to be able to interactively configure his desired purchase. This is a serious problem because it severely limits the targeted on-line community that a seller may reach.

A knowledge base configuration process known to the inventor and described with reference to the priority application to this CIP application as listed under the Cross-Reference to related documents section above, effectively solves the above described problem related to language and platform dependency. However, clients interacting with model-presenting companies must download both the knowledge base and the knowledge base configuration software in order to configure a product to hopefully reflect the desired specifications and features which are offered.

A unique interaction topology for the network application described above is taught later in this specification with reference to FIG. 2. The advantage of this technique is that configuration is comparatively swift because it is done locally (client side). A drawback is the requirement for downloading the knowledge base and any updates that may be required including updates to the applet that configures the knowledge base.

It is desired by many clients who buy interactively over a WAN via the use of knowledge bases, that software downloading be kept to a minimum, as it is time consuming and uses otherwise available computer memory. Moreover, since the first application communication speed for WAN systems like the Internet has improved dramatically. What is clearly needed is an executable interface that would allow a client to configure a knowledge base and transact an order with the company without being required to download the knowledge base or software to configure the knowledge base.

SUMMARY OF THE INVENTION

In a preferred embodiment of the present invention a method for configuring a knowledge-based object model located at a server platform from a client platform via a data network is provided, comprising steps of (a) providing the object model and a configurator at the server platform; (b) transporting, from the server platform to the client platform, a GUI user-interface application capable of manipulating the configurator over the data network; and (c) invoking the GUI user-interface application at the client platform by a client, and using the GUI user-interface application to configure the object model at the server from the client platform. In some embodiments the GUI user-interface application is a Java-based applet. Also, the server platform may be a first Internet-connected computer and the client platform is a second Internet-connected computer. The GUI user-interface application may also be a WEB-browser plug-in in some embodiments. In many cases the client platform connects to the Internet through an Internet Service Provider (ISP), the server platform is hosted by an enterprise, and the client uses the downloaded GUI user-interface application to configure the object model to select and order a product or service offered by the enterprise.

In another aspect of the invention a system for selling products and services from a computerized server in a wide area network is provided, comprising a knowledge base stored at or accessible to the server; a configurator executable at the server platform to configure the knowledge base; and a GUI user-interface application capable of manipulating the configurator over the data network, executable on a client platform connected to the server platform by a data link. In this embodiment a client uses the GUI user-interface application over the data link to manipulate the configurator to configure the knowledge base.

Also in this embodiment of a system, the GUI user-interface application may be a Java-based applet. The server platform can be a first Internet-connected computer and the client platform a second Internet-connected computer, in which case the GUI user-interface application may be a WEB browser plug-in. Preferably the client platform connects to the Internet through an Internet Service Provider (ISP). Typically server platform is hosted by an enterprise, and the client uses the downloaded GUI user-interface application to configure the object model to select and order a product or service offered by the enterprise.

BRIEF DESCRIPTION OF THE DRAWING FIGURES

FIG. 3 is a block diagram illustrating client interaction with a WEB-based knowledge base according to an embodiment of the present invention.

DESCRIPTION OF THE PREFERRED EMBODIMENTS

Figure 1:
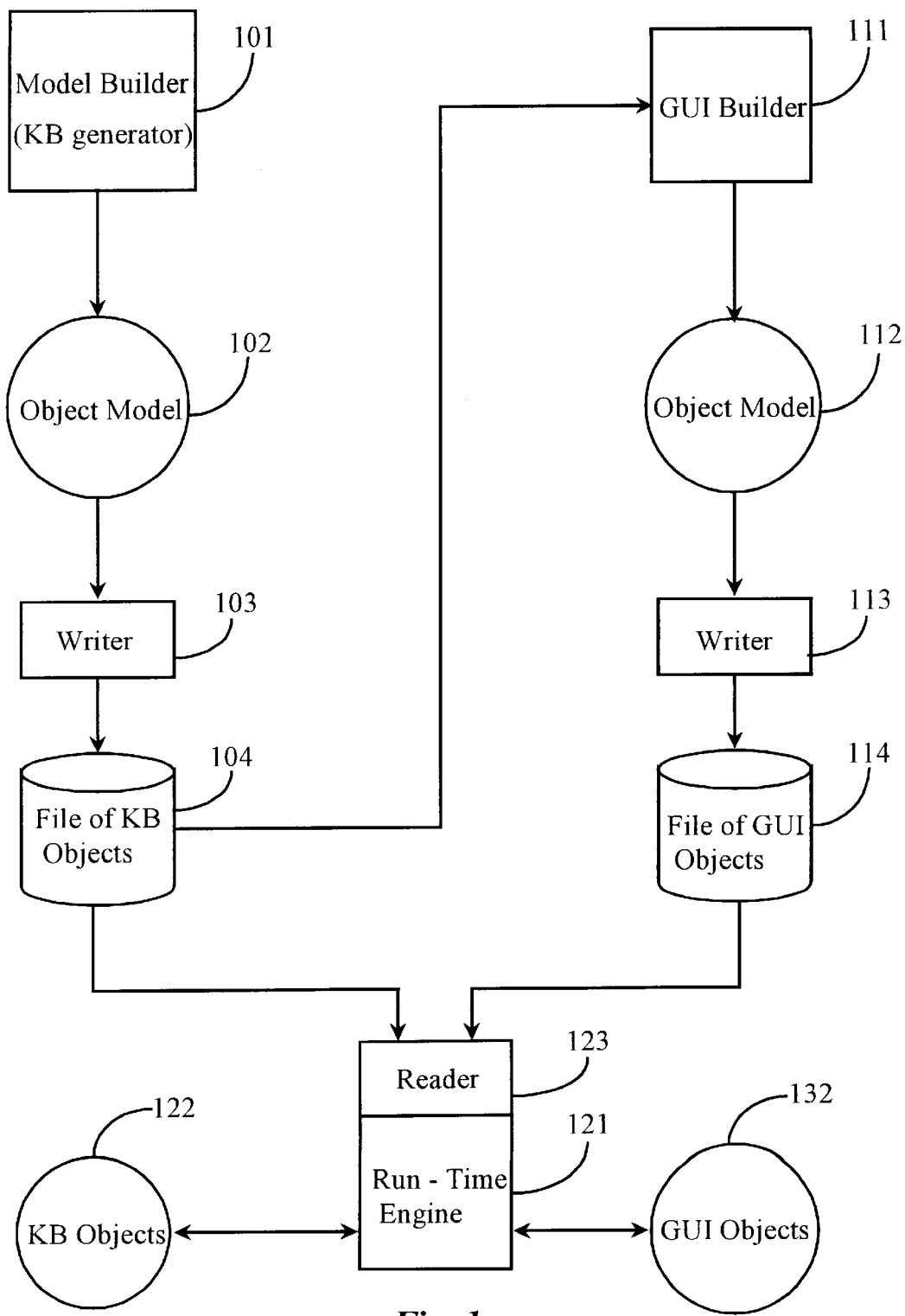
FIG. 1 is a flow chart illustrating a procedure for a knowledge base application according to an embodiment of the present invention.

FIG. 1 is a flow chart illustrating a knowledge base work flow application according to an embodiment of the present invention wherein both knowledge base objects and GUI objects are generated and presented to a client by an advertiser or seller of a product.

A knowledge base generator or model builder 101 is used at the sellers end to create a desired object model 102. As described briefly with reference to the background section, object model 102 contains all of the information related to the represented object or product such as dimensions, colors, styles, pricing and the like. Model builder 101 is a software tool known to the inventor in the art of generating knowledge bases.

In a preferred embodiment of the present invention a programming language such as Java or C+ is used in the building of object model 102. The reason for this is because these languages are relatively universal and usable among different platforms. It will be apparent to one with skill in the art that many different programming languages could be used in creating object model 102 without departing from the spirit and scope of the present invention such as Perl or Visual Basic. The languages mentioned above are used in a preferred embodiment for reasons described above.

A unique and innovative method according to an embodiment of the present invention is initiated by using a model-converting writer 103 to write object model 102 into the form of a collection of human readable files. ASCII files.

Such files are commonly referred to by those with skill in the art as flat files, and are typically human readable and sensical. A flat file 104 which is an ASCII file containing knowledge base objects that have been converted and written by model-converting writer 103 can be transported to the client over the Internet or another type of network. Flat file 104 is an external media type file that can be read by a computer program or by a person. Therefore the recreation or modification of the object models can be automated or manual. Also, communications across different platforms is sometimes "intransparent", meaning only human readable files can be transferred. Other file types, such as binary files, can contain characters that would be interpreted by either entity (sending or receiving computer) as commands, including such commands that can disrupt or terminate such communications.

Flat file 104 in an embodiment of the invention is used as a source for a GUI builder 111 in the process of building a GUI object model 112. GUI-object model 112 insures that there are graphical or visual representations of the appropriate parts of object model 102. Using a conversion-model writer 113, GUI-object models are written into the form of a human-readable ASCII flat file along with some optional multimedia files for filling in the GUI that can then be sent to a client.

The incorporation of a human readable, ASCII format into the knowledge base process allows for the transporting of the associated information across different computer platforms as well as allowing for the use of differing languages. This unique method utilizes known software applications such as model-converting writers 103, and 113 and enhances them with the capability of converting the object models into flat files as explained and taught above.

In FIG. 1, dotted line 110 represents a network transmission interface, such as transmission of files to a client via an Internet connection.

Those steps and processes appearing above line 110 are on the seller's side, and those below are on the client's side. Presumably, in the case of the Internet, the client has accessed the seller's Internet site, and is capable of downloading selected information. Whether or not the information downloaded is useful to the client is an issue addressed by the present invention.

At the client's end, a reader application 123 reads the flat files downloaded from the advertiser's site and rebuilds these files into objects for a knowledge-based configurator known in the art as a run-time engine 121. Run-time engine 121 converts flat files 104 and 114 back into knowledge base objects 122 and GUI objects 132 which are the same as object models 102 and 104. For example, if the same programming language and environment is used in run-time engine 121 as in model builder 101, then knowledge base 122 will be identical to object model 102 both binaurally and descriptively. The same relationship can be concluded with regards to GUI objects 132 and object model 112. If a different language and environment is used in run-time generator 121 that that used in model builder 101, then the files are not binaurally identical, but will accurately describe the same object.

A process of the present invention as described above could be used to up-date configurator systems such as run-time engine 121. Editing or changing rules could be done from within the knowledge base instead of from within the object model via the addition of a reader that reads the flat file back into object model 102.

Method and Apparatus for Remote Client to Knowledge Base Interaction

According to a preferred embodiment of the present invention, a method and apparatus is provided wherein a client may interact with and configure a knowledge base without downloading the knowledge base or software used to manipulate the knowledge base.

Figure 2:
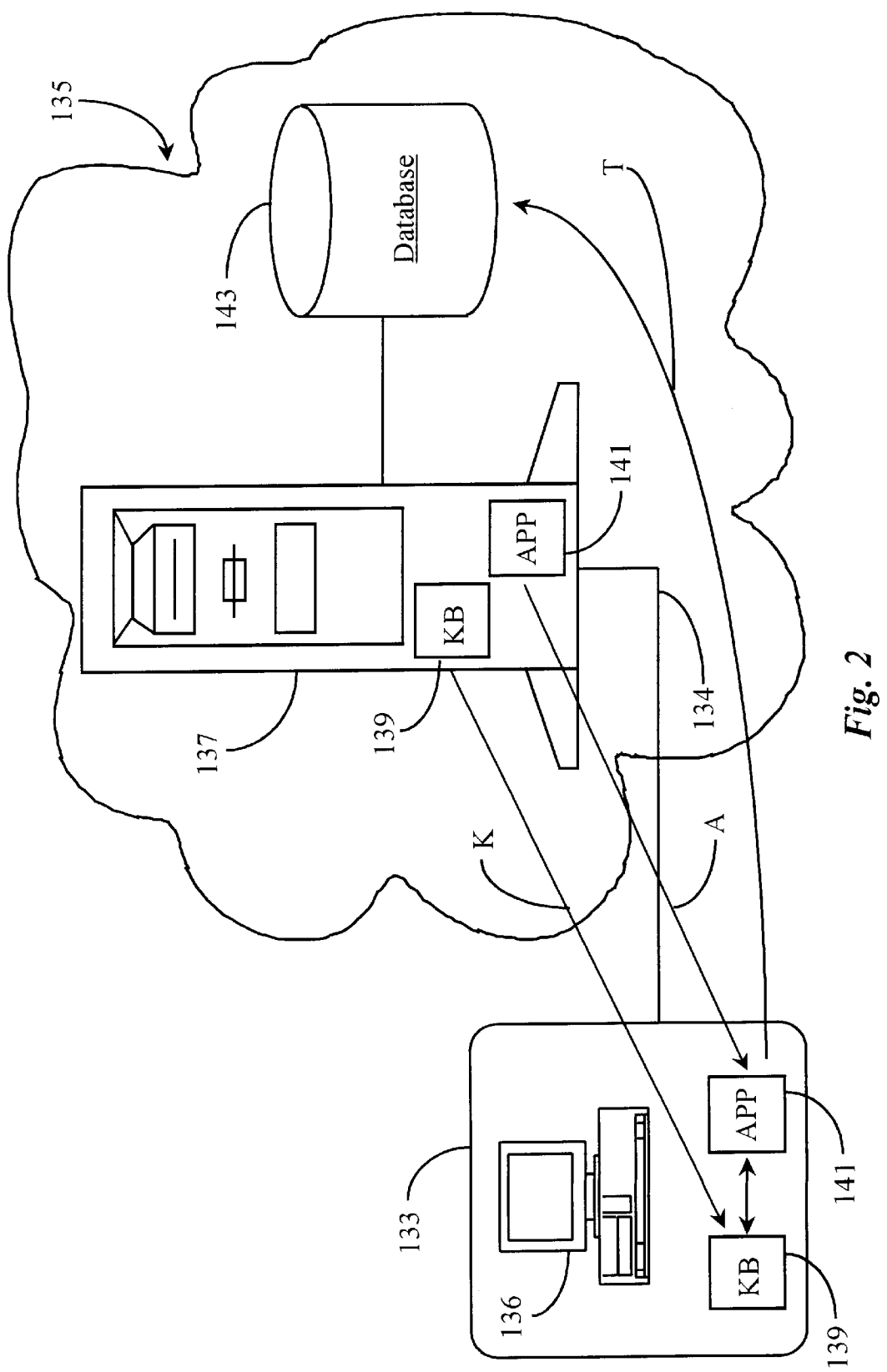
FIG. 2 is a block diagram illustrating system architecture and client interaction with a WEB-based knowledge base according to an embodiment of the invention described in priority document Ser. No. 08/962,594.

FIG. 2 is a block diagram illustrating client interaction with a WEB-based knowledge base according to an embodiment of the invention described and claimed in application Ser. No. 08/962,594. In order to enable an adequate explanation of the present invention, the inventor has chosen to first illustrate a network topology that is consistent with the priority application listed under the Cross-Reference to Related Documents above.

According to the prior embodiment, a unique method was taught for client interaction with WAN-based knowledge bases that is adapted to save the client time and resources when configuring a product or service for order. The topology as illustrated herein with reference to FIG. 2 comprises a client 133 that is connected to a wide area network (WAN) 135, such as the Internet, via a remote network connection 134, such as a typical Internet connection known in the art. The method of connection may also, in some embodiments, be that of a shared network connection such as may be the case of a smaller local area network (LAN) connected to WAN 135.

WAN 135 may be the Internet, an Intranet, or another type of WAN known in the art. Client 133 has a personal computer (PC) 136 having the capability and equipment to enable the above described connection to WAN 135 as known in the art. WAN 135 comprises a server 137 adapted to serve and receive data to and from PC 136 at the location of client 133. File server 137 is typically hosted by an enterprise engaged in selling products to clients such as 133 over WAN 135, as is consistent with the method taught with respect to the priority application. A database 143 is illustrated as being connected to file server 137 as is known in the art of server/database relationships as practiced on a WAN.

A knowledge base 139 is resident in server 137, or accessible from database 143, along with an applet 141 adapted to manipulate and configure knowledge base 139. The configuration of knowledge base 139 is defined, for the purpose of clarity, as selecting the desired options relating to color, model number, optional accessories, and the like, as may be offered as interactive options in the knowledge base representing the product.

Knowledge base 139 is analogous to components 104 and 114 as listed above line 110 (seller's end) in FIG. 1 of the priority application. Knowledge base 139 as such is also illustrated logically as downloaded to PC 136 at the location of client 133 as indicated via directional arrow K. At PC 136, knowledge base 139 is analogous to elements 122 (KB Objects) and element 132 (GUI Objects) as illustrated below line 110 (client's side) of FIG. 1.

It will be apparent to one with skill in the art that there may be many more than one knowledge base and associated applet available from server 137 without departing from the spirit and scope of the present invention. However, the inventor chooses to illustrate only one knowledge base and one applet in order to simplify explanation of the present invention.

Applet 141 is analogous to Reader 123 and Run-Time Engine 121 as illustrated below line 110 (client's end) in FIG. 1. Applet 141 is also illustrated as downloaded to PC 136 as was described above with reference to knowledge base 139. The download is illustrated via directional arrow A. In this way, client 133 may configure his product off-line via use of the downloaded components. For example, applet 141 is used as a tool to configure knowledge base 139 as illustrated via bidirectional arrow placed between the two components. Once his product is configured, client 133 may go on-line (connect to WAN 135) and upload a finished order to server 137 which may in turn communicate with database 143 and relay information back to client 133. Database 143 typically contains data related to the products provided by the company presenting the knowledge bases and may also contain additional information such as shipping dates, product status, product updates, applet updates and so on.

Working off-line allows client 133 to configure knowledge base 139 at his leisure and allows him to place an order for the configured product at any desired time. In this case, ASCII files (flat files) along with optional multimedia files as described with reference to FIG. I are sent in the download of knowledge base 139 as represented by arrow K. This allows for differences in computer platform and languages to be utilized on the same network-interaction topology. While this unique topology and method provides distinct advantages to client 133, he still must download applet 141 and knowledge base 139 in order to configure and place his order. This could be an issue if he is using someone else's computer, for example, wherein downloading components is not desired or approved by the owner. Similarly, he may be sharing a common system with several users with policy governing the system discouraging or forbidding such purchasing wherein significant downloading is required.

According to a preferred embodiment of the present invention, a unique applet is provided and adapted to function as a controller for manipulating an applet such as applet 141 of FIG. 2 to configure a knowledge base such as knowledge base 139 of FIG. 2. This innovative applet gives a client complete control over the configuration of his product and transaction of his order.

FIG. 3 is a block diagram illustrating architecture and client interaction with a WEB-based knowledge base according to an embodiment of the present invention. In order to avoid redundancy elements of topology and components that are not new to the invention will not be reintroduced and retain their same element numbers.

The network topology of FIG. 3 is essentially the same as the network topology illustrated with reference to FIG. 2. For example, client 133 is connected via remote connection 134 to server 137, which in turn is connected to database 143 as was described with reference to FIG. 2.

However, a difference exists in the way that the client interacts with knowledge base 139 and applet 141.

A graphical user interface (GUI) applet 145 is provided and adapted to communicate and exert control over applet 141 which in turn enables the configuration of knowledge base 139. GUI 145 is, in this embodiment, a Java-based applet which is capable of being executed on different kinds of platforms. In alternate embodiments, GUI 145 may be COM model, or Active-X™. As a Java GUI, applet 145 is adapted to send and receive data as both text and graphics. Similar to a software control panel, a client such as client 133 uses GUI 145 to instruct applet 141 to make the desired selections required with respect to knowledge base 139 in order for a successful product order to be realized.

In this embodiment, GUI 145 is the only component that must be downloaded to PC 136 as illustrated via directional arrow G representing such download. As a control interface, GUI 145 contains only the appropriate control codes and display capability for required interaction. For example, commands may be sent to applet 141 to execute desired selections, while displayable results of such selections appear in a display window or dialog box associated with GUI 145. This allows GUI 145 to remain very small in overall data size, therefore, largely reducing any download requirements that otherwise may be presented.

GUI 145 may be in the form of a WEB-browser plug-in. As a Java enabled plug-in, GUI 145 may be capable of transmitting and receiving audio, audio/video, text and graphics, or any other supported media. In one embodiment, GUI 145 may be embedded in a WEB form downloaded by client 133 from the company selling the products.

GUI 145 has the ability to communicate with applet 141 as illustrated via directional arrow C. Communication between GUI 145 and applet 141 in server 137 is such that knowledge base options may be viewed, and selections may be made wherein upon making a selection, viewable results of the selection are presented in a GUI-associated display or window. GUI 145 may contain application program interfaces (API's) adapted to invoke installed readers, viewers, players, and such as may be required to disseminate audio or graphic content. In one embodiment, the required or selected viewing capability is supplied with GUI 145.

The unique method of providing a GUI as an interface produces an option wherein a client need not perform any significant downloading in order to configure and present an order to a company. The complete configuration and transaction of an order takes place on-line. Updates to client software are minimized as only GUI updates are required when significant editing is done to an existing GUI. Such updates may be delivered to a client via push technology such as e-mail, or offered to the client in the form of an interactive update button. One example of a GUI update may be that a new media is supported. Code enabling the media may be sent as an executable and configure itself to the existing GUI code.

With the use of GUI 145, a client such as client 133 cannot now configure his product off-line and send an order whenever he decides. However, this disadvantage is substantially off-set by the fact that downloading is at a minimum. In many cases, configuring and ordering a product on-line with GUI 145 will be faster than downloading components that would be required when performing the same task without GUI 145.

Of course, this will depend on the size and complication of the downloaded knowledge base and associated controls.

After configuring a knowledge base such as knowledge base 139, GUI 145 may act as an interface to database 143 through applet 141. For example, the actual transaction of the order, confirmation of the receipt of the order and any added information such as real-time status, any conflict information such as might cause delay in shipment, and so on, may be relayed to client 133 via applet 141 and GUI 145.

It will be apparent to one with skill in the art that an applet such as GUI applet 145 may be created supporting varying media types as may be offered in a presentation or product promotion and that such media types may be already installed on PC 136 and invoked by GUI 145, or be provided in their entirety as viewers within GUI 145.

It will also be apparent to one with skill in the art that the use of ASCII files as illustrated with regards to FIG. 1 (P3501PA) may be practiced on the sellers side if more than one computer language or platform is evident among several systems connected to the sellers network. With the provision of GUI 145, a client such as client 133 will not be required to work with ASCII files.

It will be apparent to one with skill in the art that a method of the present invention such as described with reference to FIG. 1 could use a variety of different programming languages as known in the art without departing from the spirit and scope of the present invention. It will also be apparent to one with skill in the art that the method of the present invention may be adapted to be transported across a variety of known computer platforms without departing from the spirit and scope of the present invention. For example a client using a windows operating system may download and configure ASCII files that were generated in a UNIX environment and so on.

The spirit and scope of the present invention is limited only by the claims that follow.

What is claimed is:

1. A method for selling a product or service over the Internet, comprising steps of:

(a) providing an object model at a server platform the object model defining optional features for the product or service, and also providing a configurator for the object model at the server platform;

(b) responding to a client request for service from a client platform by transporting, from the server platform to the client platform, a graphical user-interface (GUI) user-interface application capable of remotely manipulating the configurator over the Internet;

(c) invoking the GUI user-interface application at the client platform by a client, and using the GUI user-interface application to command the configurator at the server via the Internet to configure the object model at the server from the client platform, enabling the client to select among the multiple features of the product or service for purchase;

(d) configuring the object model according to the selections of the client; and (e) viewing the final configuration and ordering the configured product or service by the client over the Internet.

2. The method of claim 1 wherein the GUI user-interface application is a Java-based applet.

3. The method of claim 1 wherein the GUI user-interface application is a WEB-browser plug-in.

4. The method of claim 1 wherein the client platform connects to the Internet through an Internet Service Provider (ISP).

5. A system for selling products and services from a computerized server in the Internet network, comprising:

a knowledge base stored at or accessible to the server, the knowledge base providing multiple versions of a product or service offered by an enterprise hosting the server, including at least one of color, size, model number, or optional features for the product or service;

a configurator executing at the server platform to configure the knowledge base;

a GUI user-interface application operating from a client platform capable of manipulating the configurator over the Internet network connected to the server platform by an Internet link;

wherein a client uses the GUI user-interface application over the data link to manipulate the configurator to configure the knowledge base at the server platform, selecting the individual one of the multiple version of the product or service desired by the client including at least one of color, size, model number, or optional accessories for the product, the client then viewing the configured knowledge base and placing an order for the selected product or service.

6. The system of claim 5 wherein the GUI user-interface application is a Java-based applet.

7. The system of claim 5 wherein the GUI user-interface application is a WEB browser plug-in.

8. The system of claim 5 wherein the client platform connects to the Internet through an Internet Service Provider (ISP).

* * * * *